L. F. HARRIS.
FERTILIZER DISTRIBUTER.
APPLICATION FILED FEB. 8, 1918.

1,329,597.

Patented Feb. 3, 1920.
2 SHEETS—SHEET 1.

INVENTOR
Luther F. Harris

WITNESSES

ATTORNEY

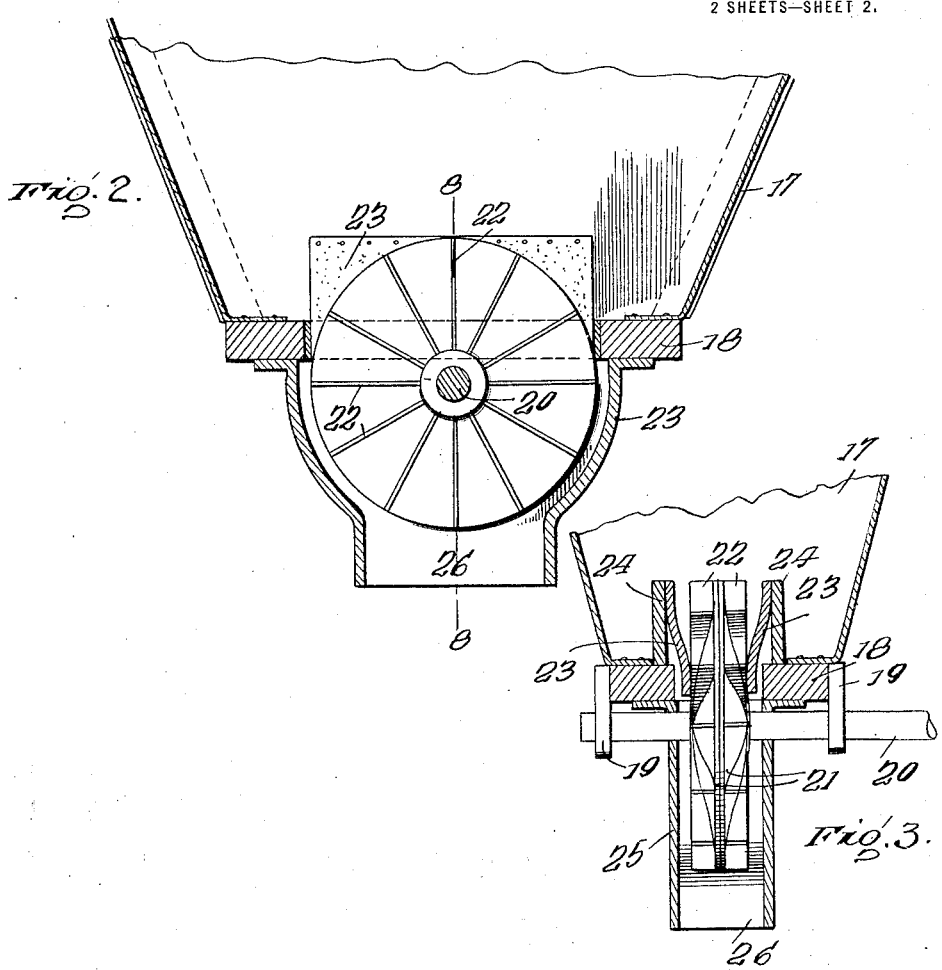

UNITED STATES PATENT OFFICE.

LUTHER F. HARRIS, OF FARMVILLE, NORTH CAROLINA.

FERTILIZER-DISTRIBUTER.

1,329,597.      Specification of Letters Patent.      Patented Feb. 3, 1920.

Application filed February 8, 1918. Serial No. 216,050.

*To all whom it may concern:*

Be it known that I, LUTHER F. HARRIS, a citizen of the United States, residing at Farmville, in the county of Pitt and State of North Carolina, have invented certain new and useful Improvements in Fertilizer-Distributers, of which the following is a specification.

This invention has relation to agricultural machines, and has for an object to provide a fertilizer distributer embodying many novel improvements calculated to simplify the construction of the machine, and to generally improve the operation and efficiency of machines of this type.

Another object of the invention is to provide a fertilizer distributer of a novel construction embodying an agitator and broadcast distributer to discharge the fertilizer uniformly over the area to be planted.

In addition to the foregoing my invention comprehends improvements in the details of construction and arrangement of the parts to be hereinafter more fully described and particularly set forth in the appended claims.

In the accompanying drawings in which similar and corresponding parts are designated by the same characters of reference throughout the several views in which they appear:

Fig. 2 is a longitudinal detail sectional view taken on the line 7—7 of Fig. 1.

Fig. 3 is a vertical detail section taken on the line 8—8 of the immediately preceding figure.

Figure 1:
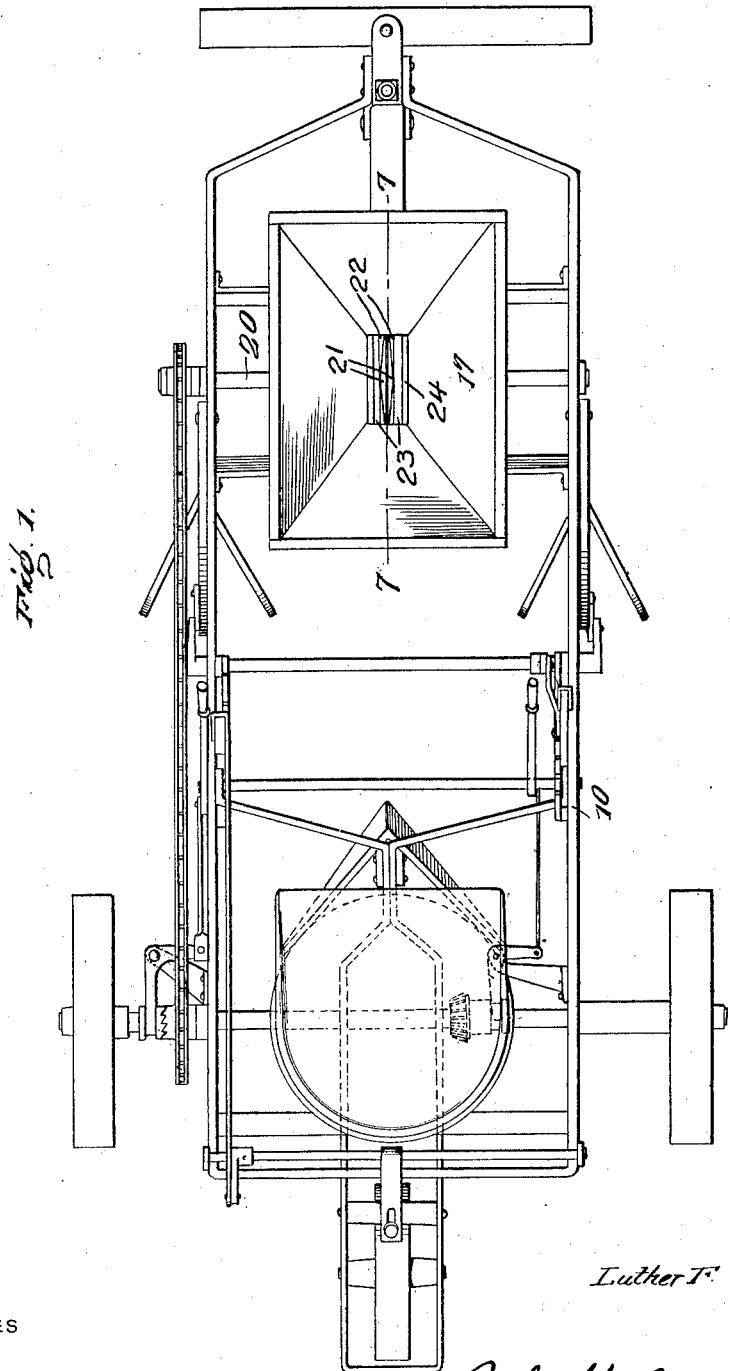
Figure 1, is a view in top plan of a seed planter with my fertilizer distributer mounted thereon.

With reference to the drawings, 10 indicates generally the main frame of a planter, to which is secured my fertilizer distributer at the forward end of the frame and comprises a hopper 17 having a downwardly converging side and the parts of which are shown in detail in Figs. 2 and 3. An opening is provided in the lower end of the hopper, and an oblong frame 18 is mounted therebeneath having a central opening of rectangular configuration to register with the opening in the hopper. Depending from each side of the frame is a bearing plate 19 carrying a transversely extending shaft 20. Mounted upon the shaft is a combined agitator and broadcast distributer in the form of a circular member formed by placing the edges of a pair of concavo-convex disks in contact so as to present convex surfaces outward. Arranged in radial relation upon each side of the member are a plurality of ribs 22 having their outer radial edges straight and their inner edges curved to engage upon and conform to the convex surface of the disk. The upper edge of said circular member projects through the opening of the frame 18 into the hopper and is engaged at each side by means of depending flaps 23 which are mounted upon suitable supports 24. The lower portion of the circular member depends into a casing 25 of semi-circular configuration supported upon the frame 18 having a discharge spout 26.

From the foregoing, it will be manifest that during rotation of the convex disks 21, that the ribs 22 will contact with the contents of the hopper 17 and cause said contents to be carried downwardly of the hopper into the distributing spout 26. When the disks are idle, it will be seen that the flexible flaps 23 prevent accidental discharge of the fertilizer through the spout 26, but during rotation of the disk, it will be evident that the flaps 23 aid in guiding the fertilizer to the radiating arms 22 of these disks.

While I have illustrated and described my invention with some degree of particularity, I realize that in practice various alterations thereover may be made, and I therefore desire to reserve the right and privilege of changing the form of the details of construction, or otherwise altering the arrangement of the correlative parts, without departing from the spirit of the invention or the scope of the appended claims.

Having thus described my invention what I claim as new and desire to secure by Letters Patent is:—

1. A fertilizer distributer including a hopper, a discharge spout therefor, a disk having convexed sides mounted for rotation therebetween, a plurality of radially extending ribs on the convex faces of said disk, and said ribs having their inner edges arcuated to be secured to the convex sides of said disk.

2. A fertilizer distributer including a hopper having an opening, a discharge spout mounted over said opening, a circular rotatable member therebetween projecting into the opening of the hopper, a plurality of radial ribs on each side of said member, and a pair of flaps of flexible material engaging said sides to direct material to the rotatable member, and to prevent discharge of the material except through operation of the rotatable member.

3. A fertilizer distributer including a hopper, a discharge spout therefor, and a disk interposed therebetween having a plurality of radially extending ribs to discharge material through the spout.

4. A fertilizer distributer including a hopper, a discharge spout therefor, a disk having convexed sides mounted for rotation therebetween, and a plurality of ribs on each side of the circular member operable to agitate the material of the hopper and to discharge the material into the spout.

5. A fertilizer distributer including a hopper having an opening, a discharge spout mounted over said opening, a circular rotatable member therebetween projecting into the opening of the hopper comprising a pair of convex plates having their edges in contact, a plurality of radial ribs on each side of the plate, and a pair of flaps of flexible material engaging each side of the ribs to direct material to the rotatable member, and to prevent discharge of the material except through operation of the rotatable member.

In testimony whereof I affix my signature in presence of two witnesses.

LUTHER F. HARRIS.

Witnesses:
 JAMES W. JONES,
 F. M. DAVIS.